(12) United States Patent
Li

(10) Patent No.: US 12,317,279 B2
(45) Date of Patent: May 27, 2025

(54) METHODS FOR COMMUNICATION PROCESSING AND USER EQUIPMENT

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 417 days.

(21) Appl. No.: 17/791,872

(22) PCT Filed: Jan. 17, 2020

(86) PCT No.: PCT/CN2020/072844
§ 371 (c)(1),
(2) Date: Jul. 8, 2022

(87) PCT Pub. No.: WO2021/142796
PCT Pub. Date: Jul. 22, 2021

(65) Prior Publication Data
US 2023/0085875 A1    Mar. 23, 2023

(51) Int. Cl.
*H04J 3/00* (2006.01)
*H04W 72/0446* (2023.01)
*H04W 72/23* (2023.01)

(52) U.S. Cl.
CPC ....... *H04W 72/23* (2023.01); *H04W 72/0446* (2013.01)

(58) Field of Classification Search
CPC ............ H04W 72/23; H04W 72/0446; H04W 72/046; H04W 72/232; H04L 1/08; H04L 5/0023; H04L 5/0053; H04L 5/006; H04L 5/0094; H04B 7/0621; H04B 7/0639; H04B 7/088; H04B 7/024

USPC .......................................................... 370/336
See application file for complete search history.

(56) References Cited

U.S. PATENT DOCUMENTS

| 2015/0181576 A1 | 6/2015 | Papasakellariou et al. |
| 2020/0120655 A1* | 4/2020 | Ma .................. H04L 5/0062 |
| 2021/0119688 A1* | 4/2021 | Enescu ............ H04W 52/0248 |

(Continued)

FOREIGN PATENT DOCUMENTS

| CN | 108112080 A | 6/2018 |
| CN | 109863710 A | 6/2019 |
| CN | 110351009 A | 10/2019 |

(Continued)

OTHER PUBLICATIONS

International Search Report of PCT/CN2020/072844 dated Oct. 21, 2020 with English translation, (4p).

(Continued)

*Primary Examiner* — Chuong T Ho
(74) *Attorney, Agent, or Firm* — Arch & Lake LLP; Hao Tan; Shen Wang

(57) ABSTRACT

A method for communication processing performed by a network device may include: configuring at least one of at least two time domain parameters or at least two received beams for a user equipment (UE) to receive the same downlink control information (DCI), where each of the at least two time domain parameters includes a time domain position; and sending the DCI to the UE via a physical downlink control channel (PDCCH) on the basis of the at least two time domain parameters.

16 Claims, 4 Drawing Sheets

(56) References Cited

U.S. PATENT DOCUMENTS

2021/0314985 A1* 10/2021 Yang ................. H04W 72/1268
2022/0224452 A1* 7/2022 Huang ................. H04L 1/1861

FOREIGN PATENT DOCUMENTS

| CN | 110536451 A | 12/2019 |
| CN | 110612693 A | 12/2019 |
| KR | 20180123417 A | 11/2018 |
| WO | 2018232199 A1 | 12/2018 |

OTHER PUBLICATIONS

LG Electronics, "Discussion on PDCCH repetition for URLLC", 3GPP TSG RAN WG1 Meeting #92bis, R1-1804571, Sanya, China Apr. 16-20, 2018, (4p).
First Office Action of Indian Application No. 202247045771 dated Nov. 17, 2022 with partial English translation, (6p).
Extended European Search Report of EP Application No. 20913836.1 dated Jan. 3, 2023, (11p).
InterDigital, Inc., "On PDCCH transmission with high reliability", 3GPP TSG RAN WG1 Meeting #92, R1-1802576, Athens, Greece, Feb. 26-Mar. 2, 2018, (4p).
OA issued in KR Application No. 10-2022-7026851, (13p).
OA issued in Singapore Application No. 11202251182H, (11p).

* cited by examiner ns for communication
METHODS FOR COMMUNICATION PROCESSING AND USER EQUIPMENT

CROSS-REFERENCE TO RELATED APPLICATION

This application is the U.S. national phase application of International Application No. PCT/CN2020/072844, filed on Jan. 17, 2020, the entire disclosure of which is incorporated herein by reference for all purposes.

TECHNICAL FIELD

The disclosure relates to communication technologies, and more particularly, to a method and an apparatus for communication processing, and a computer storage medium.

BACKGROUND

In a New Radio (NR) system for 5th generation mobile networks or 5th generation wireless systems (referred to as 5G), especially when the communication frequency band is above 6 GHz, there is a need to use beam-based transmission and reception to ensure a coverage range since the attenuation of high-frequency channels is relatively fast.

In the related art, only one of a plurality of transmission configuration indication (TCI) states is activated by a media access control (MAC) layer signaling corresponding to each control resource set (CORESET) for sending a physical downlink control channel (PDCCH) accordingly, where the TCI states are configured by a radio resource control (RRC) layer signaling. Then, the UE receives the PDCCH by using an optimal received beam (Rx beam), which is also used when a reference signal (RS) corresponding to a TCI state identifier is received. When the base station has a plurality of transmitter receiver points (TRPs), each TRP has one or more transmitting panels, or when the base station has only one TRP and the TRP has a plurality of transmitting panels, the plurality of panels may be used by the base station for sending data to the same user equipment (UE), and the plurality of panels may come from the same TRP or different TRPs of a cell, or may come from different cells. Similarly, when the UE also has a plurality of panels, which may be used by the UE for receiving data sent by the base station. Therefore, the reliability of the PDCCH needs to be further improved.

SUMMARY

According to a first aspect of the disclosure, there is provided a method for communication processing, performed by a network device. The method includes: configuring at least one of at least two time domain parameters or at least two received beams for a user equipment (UE) to receive the same downlink control information (DCI), in which the time domain parameter includes a time domain position; and sending the DCI to the UE via a physical downlink control channel (PDCCH) based on the at least two time domain parameters.

According to a second aspect of the disclosure, there is provided a method for communication processing, applied to a user equipment (UE). The method includes: determining at least one of at least two time domain parameters or at least two received beams to receive downlink control information (DCI), in which the time domain parameter includes a time domain position; and receiving the DCI with different received beams based on different time domain parameters in the at least two time domain parameters, in which the DCI is sent by a network device via a physical downlink control channel (PDCCH) based on the different time domain parameters.

According to a third aspect of the disclosure, there is provided a user equipment (UE). The UE includes: a processor; and a memory for storing executable instructions. When the executable instructions are executed, the processor is configured to implement a method for communication processing. The method includes: determining at least one of at least two time domain parameters and at least two received beams to receive downlink control information (DCI), wherein the time domain parameter includes a time domain position; and receiving the DCI with different received beams based on different time domain parameters in the at least two time domain parameters, wherein the DCI is sent by a network device via a physical downlink control channel (PDCCH) based on the different time domain parameters.

It should be understood that the above general description and the following detailed description are exemplary and explanatory, which are not restrictive of the disclosure.

BRIEF DESCRIPTION OF THE DRAWINGS

The accompanying drawings here, which are incorporated in and constitute a part of this specification, illustrate embodiments consistent with the disclosure and serve to explain the principles of the disclosure together with the specification.

DETAILED DESCRIPTION

Figure 1:
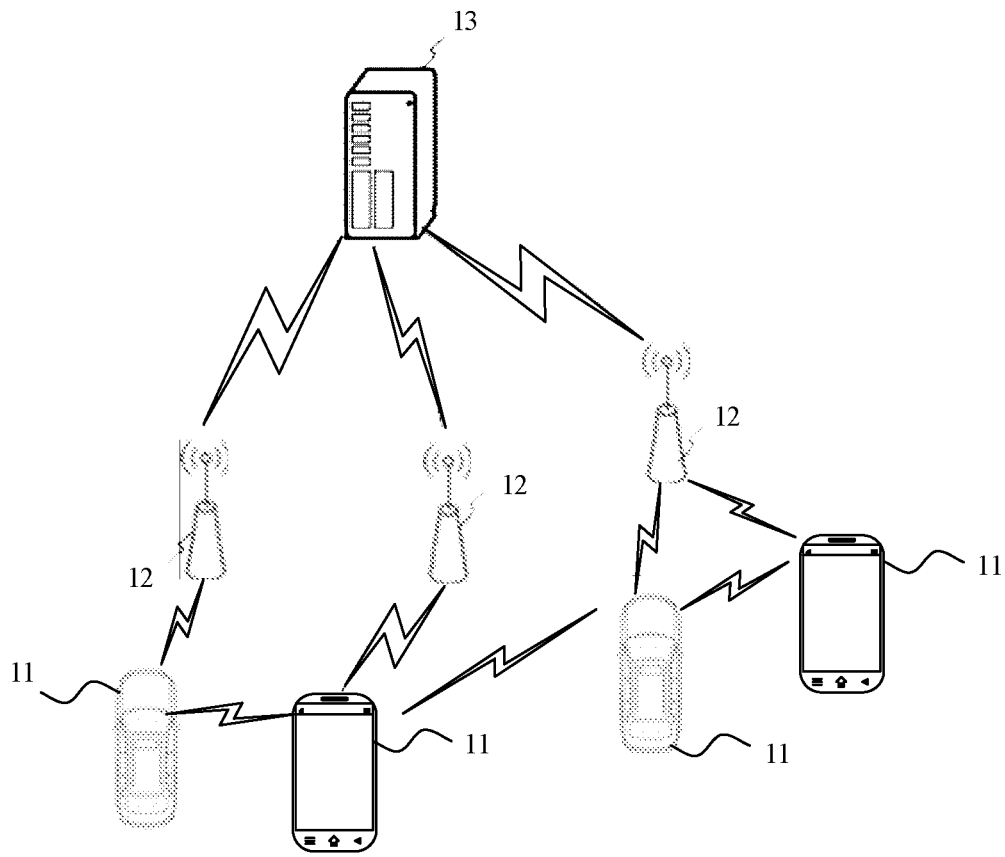
FIG. 1 is a structural schematic diagram of a wireless communication system according to an embodiment.

Embodiments will be described in detail herein, examples of which are illustrated in the accompanying drawings. Where the following description refers to the drawings, the same numerals in different drawings refer to the same or similar elements unless otherwise indicated. The implementations described in the following embodiments do not represent all implementations consistent with the embodiments of the disclosure. Rather, they are merely examples of apparatuses and methods consistent with some aspects of the embodiments of the disclosure, as recited in the appended claims.

The terms used in the embodiments of the disclosure are only for the purpose of describing particular embodiments, and are not intended to limit the embodiments of the disclosure. As used in the embodiments of the disclosure and the appended claims, the singular forms "a," "an," and "the" are intended to include the plural forms as well, unless the context clearly dictates otherwise. It will also be understood that the term "and/or" as used herein refers to and includes any and all possible combinations of one or more of the associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although the terms first, second, third, etc. may be used in embodiments of the disclosure to describe various pieces of information, such information should not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the words "if" and "in case" as used herein can be interpreted as "at the time of . . . " or "when . . . " or "in response to determining . . . ".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Referring to FIG. 1, it shows a structural schematic diagram of a wireless communication system according to an embodiment of the disclosure. As shown in FIG. 1, the wireless communication system is a communication system based on cellular mobile communication technology. The wireless communication system may include: several terminals 11 and several base stations 12.

The terminal 11 may be a device that provides voice and/or data connectivity to a user. The terminal 11 may communicate with one or more core networks via a radio access network (RAN). The terminal 11 may be an Internet of Things (IoT) terminal such as a sensor device, a mobile phone (also referred to as a "cellular" phone), and a computer with the IoT terminal. For example, the terminal 11 may be a fixed, portable, pocket, hand-held, built-in computer or a vehicle-mounted apparatus. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device connected to the external trip computer. Alternatively, the terminal 11 may also be an infrastructure, for example, a streetlight, a signal light, or other infrastructure with a wireless communication function. The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G system. The access network in the 5G system may be called a new generation-radio access network (NG-RAN). Alternatively, it is a machine-type communication (MTC) system.

The base station 12 may be an evolved base station (eNB) used in the 4G system. Alternatively, the base station 12 may also be a base station (gNB) that adopts a centralized distributed architecture in a 5G system. When the base station 120 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the terminal 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the terminals 11, for example, vehicle-to-vehicle (V2V) communication, vehicle to infrastructure (V2I) communication and vehicle to pedestrian (V2P) communication and other communication scenes in vehicle-to-everything (V2X) communication. The terminal 11 and the base station 12 may also both be vehicle-mounted devices.

In some embodiments, the above wireless communication system may further include a network management device 13.

Several base stations 12 are respectively connected to the network management device 13. The network management device 13 may be a core network device in a wireless communication system. For example, the network management device 130 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

In the NR system, especially when the communication frequency band is above 6 GHz, since the high-frequency channel attenuates rapidly, there is a need to use beam-based transmission and reception in order to ensure the coverage range.

At present, for beam-based reception, the base station indicates a TCI state of type D through a signaling, and informs the UE of the beam to be used when receiving. Each TCI state corresponds to an RS ID, where the RS may be a non-zero power (NZP) channel state information-reference signal (CSI-RS) resource, or a synchronization signal block (SSB), or may also be a sounding reference signal (SRS). So far, it is considered that the base station uses a panel for sending the PDCCH to the UE, in which the TCI states of the PDCCH are a list of TCI states configured by the RRC signaling for each CORESET and there are a plurality of TCI states (such as 64) on the list, the MAC signaling activates one of the plurality of TCI states configured by the RRC signaling for each CORESET. Then, when the base station sends the PDCCH to the UE, a received beam of a reference signal corresponding to the TCI state activated by the MAC is used by the UE to receive PDCCH on the CORESET resource. Currently for the PDCCH on one CORESET resource, the base station configures one TCI state for the UE.

When the base station has a plurality of TRPs and each TRP has one or more transmitting panels, or when the base station has only one TRP and the TRP has a plurality of transmitting panels, the base station may simultaneously send the same PDCCH to the same UE by using the plurality of panels, which may be from the same TRP or different TRPs. That is, the PDCCH is repeatedly sent. Moreover, different cells may also repeatedly send the PDCCH to the same UE by using different panels. In this case, sending directions of different panels are different, so the UE also needs to receive the plurality of PDCCHs by using different panels, and the base station needs to indicate different TCI states to the UE, in which each TCI state corresponds to a received beam direction on each panel of the UE.

When a TCI state identifier of type D is given by a signaling, it is instructed the user receives the PDCCH by using the optimal received beam (Rx beam), which is also used when the RS corresponding to the TCI state identifier is received, as described in Table 1.

TABLE 1

| TCI states | RS index | notes |
|---|---|---|
| TCI#0 | SSB index#1 | If the base station tells the UE to use TCI#0, it tells the UE to receive the PDCCH by using the optimal Rx beam when receiving the SSB index#1 |
| TCI#1 | SSB index#2 | |
| TCI#2 | CSI-RS index#5 | |
| TCI#3 | CSI-RS index#6 | |
| ... | ... | |

In the related art, for the CORESET for PDCCH transmission, the MAC signaling corresponding to each CORESET may activate one of a plurality of TCI states configured by its RRC signaling, then the TCI state activated by the MAC signaling is used to determine the received beam when the UE receives the PDCCH sent on the CORESET.

When the base station configures a CORESET for the UE, a CORESET index may be configured (the CORESET index is identical for the CORESET from the same panel of the same TRP), a CORESET ID may be also configured, together with a time domain position and a frequency domain position occupied by the CORESET, and space domain resources (i.e., TCI states activated by the MAC signaling). The time domain is only configured with symbols and a starting symbol position is determined by a search space.

Based on the above wireless communication system, various embodiments of the disclosed method are proposed on how to improve the reliability of the PDCCH.

Figure 2:
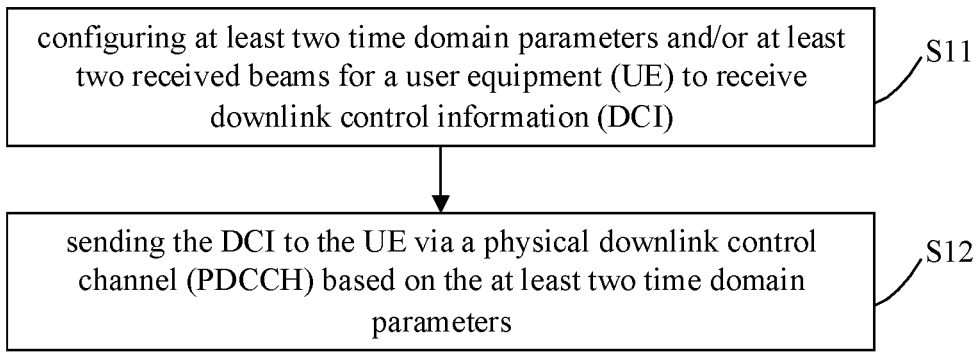
FIG. 2 is a first flowchart of a method for communication processing according to an embodiment.

FIG. 2 is a first flow chart of a method for communication processing according to an embodiment. As shown in FIG. 2, the method for communication processing is used in a network device such as a base station, and includes the following steps.

In step S11, at least two time domain parameters and/or at least two received beams are configured for a user equipment (UE) to receive the same downlink control information (DCI).

In step S12, the DCI is sent to the UE via a physical downlink control channel (PDCCH) based on the at least two time domain parameters.

In this embodiment, the time domain parameter may refer to a PDCCH monitoring time domain parameter that appears in one cycle in a search space, or may refer to a PDCCH monitoring time domain parameter that appears in each cycle.

In this embodiment, the time domain parameter includes a time domain position.

In the technical solutions described in the embodiments of the disclosure, the network device configures at least two time domain parameters and/or at least two received beams for the UE to receive the same DCI, and sends the DCI via the PDCCH to the UE based on the at least two time domain parameters. In this way, the same DCI is repeatedly sent to the same UE via the PDCCH based on at least two time domain parameters, so that the UE may receive the same DCI by using different received beams based on at least two time domain parameters, thus improving the reliability and robustness of PDCCH communication.

Considering that the at least two time domain parameters may belong to the same search space, in some embodiments, the method further includes: configuring a search space for the UE, in which the at least two time domain parameters correspond to the same search space.

Configuration of the search space includes configuration of the following parameters: a PDCCH monitoring cycle, a PDCCH monitoring slot offset value and a within-slot monitoring-symbol position.

The PDCCH monitoring cycle is N slots; the PDCCH monitoring slot offset value is M slots, where M is 0 to N−1; and the within-slot monitoring-symbol position indicates a starting symbol position of the CORESET and determines a symbol position of the CORESET by adding a number of CORESET symbols to the starting symbol position of the CORESET.

In some embodiments, the at least two time domain parameters correspond to different symbols within a slot in the search space.

The within-slot monitoring-symbol position is a sequence of 14 bits, i.e., 14 symbols in one slot. If a symbol needs to be monitored, the bit is equal to "1", otherwise "0". Since it is a 14-bit sequence, the PDCCH monitoring cycle may be the same as the PDCCH monitoring slot offset value, but the within-slot monitoring-symbol position is used to distinguish time domain parameters where different panels send the DCI for the terminal. Taking two panels as an example, the first 7 bits in the within-slot monitoring-symbol position indicate a starting symbol position of the panel #0 to send the PDCCH, which corresponds to the first TCI state; and the last 7 bits indicate a starting symbol position of the panel #1 to send the PDCCH, which corresponds to the second TCI state. The number of symbols for sending the PDCCH corresponding to each panel is the same as a number of symbols in the time domain resource configuration of CORESET corresponding to the search space. When there are more than two panels, the 14 bits are divided into more bit sets, and each bit set indicates a starting symbol position of the corresponding panel to send the PDCCH. Alternatively in another indication method, the within-slot monitoring-symbol position with a length of the 14-bit sequence is still only used to indicate the starting symbol position of the PDCCH, while for symbols in the time domain resource configuration of CORESET corresponding to the search space, a half of the symbols are used by one panel to send the PDCCH and the other half of the symbols are used by the other panel to send the PDCCH. Taking panel #0 and panel #1 as an example, the within-slot monitoring-symbol position corresponding to the search space is symbol #0 for example, and the number of symbols in the time domain resource configuration of CORESET corresponding to the search space is 4, then symbol #0 and symbol #1 are used by panel #0 to send the PDCCH for the UE, which corresponds to the first TCI state; symbol #2 and symbol #3 are used by panel #1 to send the PDCCH for the UE, which correspond to the second TCI state. When there are more than two panels, the time-domain symbols configured by the CORESET are divided into more symbol sets, and each symbol set is used by a corresponding panel to send the PDCCH for the terminal, which corresponds to a different TCI state. Therefore, for the DCI of the at least two different time domain parameters in the same search space, at least two different received beams need to be configured for the terminal.

The different panels may be different panels of the same TRP, or different panels of different TRPs, or different panels of different cells, which are not repeated in the specification later.

In this way, the at least two time domain parameters are indicated by configuring one search space for the UE.

In another embodiments, the at least two time domain parameters correspond to symbols within different slots in the search space.

Exemplarily, when the PDCCH monitoring-symbols appear in different slots, PDCCH monitoring-symbols in a first slot having PDCCH monitoring-symbols are used by a first panel to send the DCI for the terminal, and PDCCH monitoring-symbols in a second slot having PDCCH monitoring-symbols are used by a second panel to send the DCI for the terminal. When there are more than two panels, a slot corresponding to each panel to send the PDCCH for the terminal occurs in order. Therefore, for the DCI of the at least two different time domain parameters in the same search space, at least two different received beams need to be configured for the terminal.

In this way, the at least two time domain parameters are indicated by configuring one search space for the UE.

Considering that the at least two time domain parameters may belong to different search spaces but belong to the same CORESET, therefore in some embodiments, the method further includes: configuring a search space for the UE, in which the first time domain parameter in the at least two time domain parameters corresponds to the search space; and configuring a relative offset value of the search space for the UE, in which the relative offset value of the search space is an offset value of a second time domain parameter in the at least two time domain parameters relative to the first time domain parameter.

In this embodiment, the second time domain parameter is another time domain parameter other than the first time domain parameter among the at least two time domain parameters.

Configuration of the search space includes configuration of the following parameters: a PDCCH monitoring cycle, a PDCCH monitoring slot offset value and a within-slot monitoring-symbol position.

The PDCCH monitoring cycle is N slots; the PDCCH monitoring slot offset value is M slots, where M is 0 to N−1; and the within-slot monitoring-symbol position indicates a starting symbol position of the CORESET and determines a PDCCH monitoring-symbol position of the CORESET by adding a number of CORESET symbols to the starting symbol position of the CORESET.

In some embodiments, the relative offset value of the search space includes: one or more combinations of a relative offset value of a PDCCH monitoring cycle, a relative offset value of a PDCCH monitoring slot offset value, and a relative offset value of a within-slot monitoring-symbol position.

For example, the relative offset value of the PDCCH monitoring cycle, the relative offset value of the PDCCH monitoring slot offset value are all 0, and the relative offset value of the within-slot monitoring-symbol position is a number of symbols configured by CORESET. That is, for the two search spaces, PDCCH monitoring cycles are identical and PDCCH monitoring slot offsets are also identical but starting symbol positions are different. Thus, the PDCCH monitoring-symbols in the two search spaces are located in different symbol positions of the same slot.

In this way, the UE is informed to receive the at least two time domain parameters of the same DCI by using different beams, by configuring a search space and a relative offset value of the search space for the UE.

Considering that the at least two time domain parameters may belong to different search spaces, in some embodiments, the method further includes: configuring at least two search spaces for the UE, in which different time domain parameters in the at least two time domain parameters correspond to different search spaces.

Configuration of the search space includes configuration of the following parameters: a PDCCH monitoring cycle, a PDCCH monitoring slot offset value and a within-slot monitoring-symbol position.

The PDCCH monitoring cycle is N slots; the PDCCH monitoring slot offset value is M slots, where M is 0 to N−1; and the within-slot monitoring-symbol position indicates a starting symbol position of the CORESET, and determines a PDCCH monitoring-symbol position of the CORESET by adding a number of CORESET symbols to the starting symbol position of the CORESET.

In this way, by configuring different search spaces for the UE, the UE is informed to receive the at least two time domain parameters of the same DCI by using different beams.

Considering that only the number of occupied symbols is given in the CORESET configuration, which slot and a starting symbol position within the slot are determined by three parameters (i.e., the PDCCH monitoring cycle, the PDCCH monitoring slot offset value and the within-slot monitoring-symbol position) configured by the search space, so different panels may correspond to search spaces of different time domain parameters. Therefore, in some embodiments, the method further includes: configuring a control resource set (CORESET) for the UE, and the at least two search spaces correspond to the same CORESET.

In the above solution, the method also includes: configuring a CORESET identifier for the CORESET, where the CORESET identifier is used to indicate that received beams corresponding to different search spaces in the CORESET are different.

In the above solution, among configuration parameters of the at least two search spaces, at least one of a PDCCH monitoring cycle parameter, a PDCCH monitoring slot offset parameter and a within-slot monitoring-symbol position parameter is different.

Exemplarily, the PDCCH monitoring cycles are identical, and the PDCCH monitoring slot offsets are different.

Exemplarily, the PDCCH monitoring cycles are different, and the PDCCH monitoring slot offsets are different.

Exemplarily, the PDCCH monitoring cycles are identical, the PDCCH monitoring slot offsets are identical, but the within-slot monitoring-symbol positions are different.

In this way, by configuring two search spaces in one CORESET for the UE, and configuring different TCI states for different search spaces, it may be achieved that different panels correspondingly use different time domain parameters of different search spaces to send the same DCI for the UE.

Considering that only the number of occupied symbols is given in the CORESET configuration, which slot and a starting symbol position within the slot are determined by three parameters (i.e., the PDCCH monitoring cycle, the PDCCH monitoring slot offset value and the within-slot monitoring-symbol position) configured by the search space, so different panels may correspond to different time domain parameters for different search spaces. Therefore, in some embodiments, the method further includes: configuring at least two CORESETs for the UE, and different search spaces in the at least two search spaces correspond to different CORESETs in the at least two CORESETs.

In other words, different search spaces correspond to different CORESETs.

In the above solution, frequency domain resources of the at least CORESETs are identical.

In the above solution, time domain resources of the at least two CORESETs are identical, and CORESET identifiers or cell identifiers of the at least two CORESETs are different.

In this way, by configuring a plurality of CORESETs for the UE, and configuring different TCI states for different CORESETs, it may be achieved that different panels correspondingly use different time domain parameters of the different search spaces of different CORESETs to send the same DCI for the terminal.

Considering that the UE is enabled to receive the same DCI by using different received beams based on at least two time domain parameters, in some embodiments, the method further includes: for the same search space, configuring at least two different received beams for the UE, or for different search spaces under the same CORESET, configuring different received beams for the UE, or for different CORESETs, configuring different received beams for the UE.

In the above solution, the different received beams are used for the UE to receive DCI from different cells, or DCI from different transmitter receiver points (TRPs) in the same cell, or DCI from different antenna panels of the same TRP.

In the case where the UE are configured with at least two different received beams for the same search space, in some embodiments, the method further includes: sending a radio resource control (RRC) signaling. The RRC signaling configures multiple lists of TCI states for the terminal. Each list of TCI states corresponds to TCI state information of one panel. Alternatively, the RRC signaling configures a list of TCI states for the terminal, and the list includes TCI state information of a plurality of panels. The method further includes: sending a plurality of MAC CE signaling, where each MAC CE signaling activates a TCI state, and each TCI state is used for the terminal to receive the DCI sent by a corresponding panel; or sending a MAC CE signaling, where the MAC CE signaling activates a plurality of TCI states, and each TCI state is used for the terminal to receive the DCI sent by a corresponding panel.

In the case where the UE are configured with different received beams for different search spaces under the same CORESET, in some embodiments, the method further includes: sending a RRC signaling. The RRC signaling configures multiple lists of TCI states for the terminal. Each list of TCI states corresponds to TCI state information of one panel. Alternatively, the RRC signaling configures a list of TCI states for the terminal, and the list includes TCI state information of a plurality of panels. The method further includes: sending a plurality of MAC CE signaling, where each MAC CE signaling activates a TCI state, and each TCI state is used for the terminal to receive the DCI sent by a corresponding panel; or sending a MAC CE signaling, where the MAC CE signaling activates a plurality of TCI states, and each TCI state is used for the terminal to receive the DCI sent by a corresponding panel.

In the case where the UE are configured with different received beams for different control resource sets, in some embodiments, the method further includes: sending a RRC signaling. The RRC signaling configures multiple lists of TCI states for the terminal. Each list of TCI states corresponds to TCI state information of one panel. Alternatively, the RRC signaling configures a list of TCI states for the terminal, and the list includes TCI state information of a plurality of panels. The method further includes: sending a plurality of MAC CE signaling, where each MAC CE signaling activates a TCI state, and each TCI state is used for the terminal to receive the DCI sent by a corresponding panel; or sending a MAC CE signaling, where the MAC CE signaling activates a plurality of TCI states, and each TCI state is used for the terminal to receive the DCI sent by a corresponding panel.

In order to inform the UE of specific configuration information, in the above solution, the method further includes:

sending a configuration signaling, where the configuration signaling is used to notify the UE that DCI to be received with different received beams under the at least two time domain parameters is identical.

Exemplarily, the configuration signaling is a RRC signaling or a MAC signaling; the configuration signaling may also be used to configure at least two time domain parameters and/or at least two received beams for the UE to receive the same DCI, such as at least two received beams configured for the same search space, or different received beams configured for different search spaces under the same control resource set. That is, the terminal is implicitly notified that the DCI sent based on different time domain parameters is identical, and combined reception of the DCIs may be performed to improve the reliability.

In order to determine a received beam by the UE, in the above solution, the method further includes: sending a signaling that includes a TCI state, where the TCI state includes TCI state information of at least one cell, or TCI state information of at least one TRP in a cell, or TCI state information of at least one antenna panel of a TRP.

Exemplarily, the signaling that includes the TCI state may be a RRC signaling or a MAC signaling.

Exemplarily, in the case where a plurality of control resource sets are configured for the UE and a list of TCI states is configured for each control resource set, a TCI state corresponding to the control resource set is activated by a medium access control (MAC) layer-control element (CE) for each control resource set.

Exemplarily, in the case where a plurality of control resource sets are configured for the UE, and a list of TCI states is configured for the plurality of control resource sets, for the plurality of control resource sets, a TCI state in the list of TCI states corresponding to the plurality of control resource sets is activated by one MAC CE.

Exemplarily, when a control resource set is configured for the UE, and a list of TCI states is configured for the control resource set, the list of TCI states includes TCI state information of a plurality of panels, a plurality of TCI states in the list of TCI states corresponding to the control resource set are activated by one MAC CE.

In the method for communication processing according to the disclosure, the UE is configured to receive at least two time domain parameters and/or at least two received beams for the same DCI; the DCI is sent to the UE via the PDCCH based on the at least two time domain parameters. In this way, the same DCI is sent repeatedly to the same UE via the PDCCH under the at least two time domain parameters, so that the UE may receive the same DCI by using different received beams under the at least two time domain parameters, thus improving the reliability and the robustness of PDCCH communication.

Figure 3:
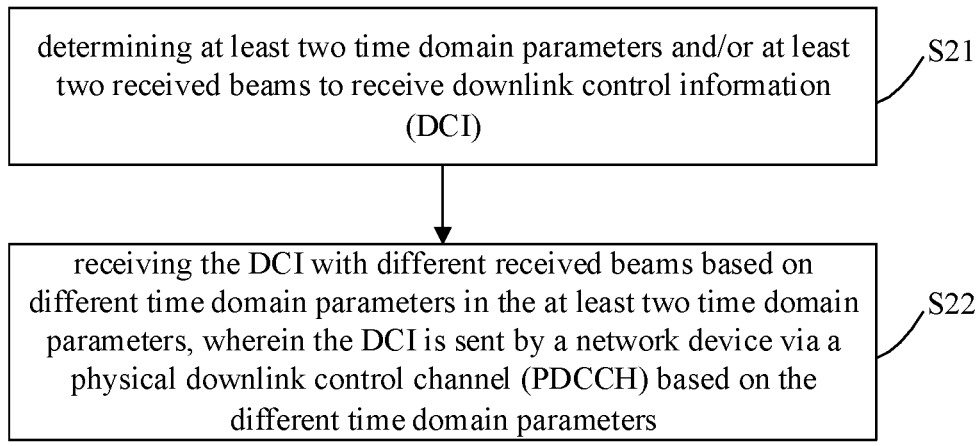
FIG. 3 is a second flowchart of a method for communication processing according to an embodiment.

FIG. 3 is a second flowchart of a method for communication processing according to an embodiment. As shown in FIG. 3, the method for communication processing is used in a user equipment (UE) and includes the following steps.

In step S21, at least two time domain parameters and/or at least two received beams to receive the same downlink control information (DCI) are determined.

In step S22, the same DCI is received with different received beams based on different time domain parameters in the at least two time domain parameters, where the DCI is sent by a network device via a physical downlink control channel (PDCCH) based on the different time domain parameters.

In the method for communication processing according to this embodiment, the UE is enabled to receive the same DCI by using different received beams under the at least two time domain parameters, thus improving the reliability and robustness of PDCCH communication.

In some embodiments, the method further includes: determining a search space configured by the network device. The at least two time domain parameters correspond to the same search space.

In this way, the UE is enabled to determine the at least two time domain parameters for receiving the same DCI sent by the network device based on the search space.

In some embodiments, the at least two time domain parameters correspond to different symbols within a slot in the search space.

In this way, the UE is enabled to determine at least two time domain parameters for receiving the same DCI sent by the network device based on the different symbols within the slot in the search space.

In the above solution, the at least two time domain parameters correspond to symbols in different slots in the search space.

In this way, the UE is enabled to determine at least two time domain parameters for receiving the same DCI sent by the network device based on the symbols in different slots in the search space.

In some embodiments, the method further includes: determining a search space and a relative offset value of the search space configured by the network device. The first time domain parameter in the at least two time domain parameters corresponds to the search space, and the relative offset value of the search space is an offset value of a second time domain parameter in the at least two time domain parameters relative to the first time domain parameter. The second time domain parameter in the at least two time domain parameters is determined based on the search space and the relative offset value of the search space.

In the above solution, the relative offset value of the search space includes: one or more combinations of a relative offset value of a PDCCH monitoring cycle, a relative offset value of a PDCCH monitoring slot offset value, and a relative offset value of a within-slot monitoring-symbol position.

In this way, the UE may determine the first time domain parameter and the second time domain parameter other than the first time domain parameter among the at least two time domain parameters based on the search space and the relative offset value of the search space.

In some embodiments, the method further includes: determining at least two search spaces configured by the network device. Different time domain parameters in the at least two time domain parameters correspond to different search spaces.

Configuration of the search space includes configuration of the following parameters: a PDCCH monitoring cycle, a PDCCH monitoring slot offset value and a within-slot monitoring-symbol position.

In this way, the UE may determine different time domain parameters among the at least two time domain parameters based on different search spaces.

In some embodiments, the method further includes: determining a control resource set configured by the network device. The at least two search spaces correspond to the same control resource set.

Determining the control resource set configured by the network device includes: determining a control resource set identifier. Different received beams corresponding to different search spaces in the control resource set are determined based on the control resource set identifier.

In the above solution, among configuration parameters of the at least two search spaces, at least one of a PDCCH monitoring cycle parameter, a PDCCH monitoring slot offset parameter and a within-slot monitoring-symbol position parameter is different.

In this way, the UE determines receiving the DCI sent by different panels for the terminal by using different received beams under different time domain parameters of different search spaces, through different search spaces under the control resource set configured by the network device.

In some embodiments, the method further includes: determining at least two control resource sets configured by the network device, where different search spaces in the at least two search spaces correspond to different control resource sets in the at least two control resource sets.

In the above solution, frequency domain resources of the at least two control resource sets are identical.

In the above solution, time domain resources of the at least two control resource sets are identical, and control resource set identifiers or cell identifiers of the at least two control resource sets are different.

In this way, the UE determines receiving the DCI sent by different panels for the terminal, by using different received beams in different time domain parameters in different search spaces, under a plurality of control resource sets configured by the network device through different search spaces.

In some embodiments, the method further includes: determining at least two different received beams configured by the network device for the same search space, or determining different received beams configured by the network device for different search spaces under the same control resource set, or determining different received beams configured by the network device for different control resource sets.

In the above solution, the different received beams are used for the UE to receive DCI from different cells, or DCI from different TRPs in the same cell, or DCI from different antenna panels in the same TRP.

In some embodiments, the method further includes: determining DCI to be sent by the network device via the PDCCH under at least two time domain parameters is identical based on a configuration signaling.

Exemplarily, the configuration signaling is a RRC signaling or a MAC signaling.

In some embodiments, the method further includes: receiving a signaling that includes a transmission configuration indication (TCI) state, and determining a received beam based on the TCI state.

Exemplarily, the signaling including the TCI state may be a RRC signaling or a MAC signaling.

The method for communication processing according to the disclosure may determine the at least two time domain parameters and/or at least two received beams to receive the same DCI; and receive the same DCI by using different received beams based on different time domain parameters of the at least two time domain parameters, the DCI being sent by the network device via the PDCCH under the different time domain parameters. In this way, the UE may use different received beams to receive the same DCI under at least two time domain parameters, thus improving the reliability and robustness of PDCCH communication.

Figure 4:
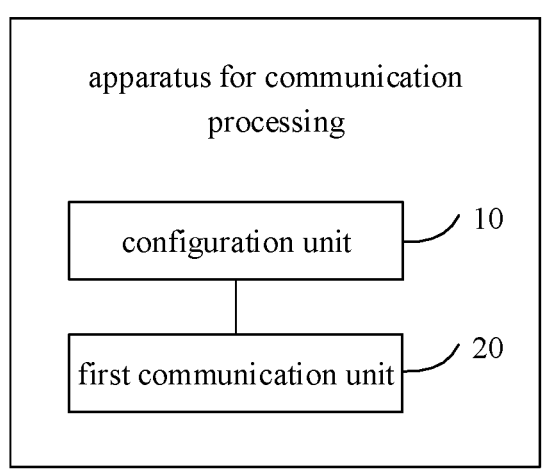
FIG. 4 is a first block diagram of an apparatus for communication processing according to an embodiment.

FIG. 4 is a first block diagram of an apparatus for communication processing according to an embodiment. The apparatus for communication processing is applied to the side of network device, such as a base station. Referring to FIG. 4, the apparatus includes a configuration unit 10 and a first communication unit 20.

The configuration unit 10 configures the UE with at least two time domain parameters and/or at least two received beams to receive same DCI.

The first communication unit 20 is configured to send the DCI to the UE via a PDCCH based on the at least two time domain parameters.

In some embodiments, the configuration unit 10 further configures a search space for the UE. The at least two time domain parameters correspond to the same search space.

In some embodiments, the at least two time domain parameters correspond to different symbols within a slot in the search space.

In some embodiments, the at least two time domain parameters correspond to symbols in different slots in the search space.

In some embodiments, the configuration unit 10 further configures a search space for the UE. The first time domain parameter in the at least two time domain parameters corresponds to the search space.

The configuration unit 10 further configures a relative offset value of the search space for the UE. The relative offset value of the search space is an offset value of a second time domain parameter in the at least two time domain parameters relative to the first time domain parameter.

In the above solution, the relative offset value of the search space includes: one or more combinations of a relative offset value of a PDCCH monitoring cycle, a relative offset value of a PDCCH monitoring slot offset value, and a relative offset value of a within-slot monitoring-symbol position.

In some embodiments, the configuration unit 10 further configures at least two search spaces for the UE, and different time domain parameters in the at least two time domain parameters correspond to different search spaces.

In the above solution, configuration of the search space includes configuration of the following parameters: a PDCCH monitoring cycle, a PDCCH monitoring slot offset value and a within-slot monitoring-symbol position.

In some embodiments, the configuration unit 10 further configures a control resource set for the UE, and the at least two search spaces correspond to the same control resource set.

In some embodiments, the configuration unit 10 further configures a control resource set identifier for the control resource set, where the control resource set identifier is used to indicate that the received beams corresponding to different search spaces in the control resource set are different.

In the above solution, among configuration parameters of the at least two search spaces, at least one of a PDCCH monitoring cycle parameter, a PDCCH monitoring slot offset parameter and a within-slot monitoring-symbol position parameter is different.

In some embodiments, the configuration unit 10 further configures at least two control resource sets for the UE, and different search spaces in the at least two search spaces correspond to different control resource sets in the at least two control resource sets.

In the above solution, frequency domain resources of the at least two control resource sets are identical.

In the above solution, time domain resources of the at least two control resource sets are identical, and control resource set identifiers or cell identifiers of the at least two control resource sets are different.

In some embodiments, the configuration unit 10 further configures the UE with at least two different received beams for the same search space, or configures the UE with different received beams for different search spaces under the same control resource set, or configures the UE with different received beams for different control resource sets.

In the above solution, the different received beams are configured for the UE to receive DCI from different cells, or DCI from different transmitter receiver points (TRPs) in the same cell, or DCI from different antenna panels of the same TRP.

In some embodiments, the first communication unit 20 is further configured to: send a configuration signaling, where the configuration signaling is configured to notify the UE that DCI to be received using different received beams under the at least two time domain parameters is identical.

In some embodiments, the first communication unit 20 is further configured to: sending a signaling that includes a transmission configuration indication (TCI) state, where the TCI state includes TCI state information of at least one cell, or TCI state information of at least one TRP in a cell, or TCI state information of at least one antenna panel of a transmitter receiver point (TRP).

Regarding the apparatus in the above-mentioned embodiments, the specific manners in which each module performs the operations have been described in detail in the method embodiments, which may not be described in detail here.

In practical applications, the specific structures of the above-mentioned configuration unit 10 and the first communication unit 20 may be implemented by a central processing unit (CPU), a micro controller unit (MCU), a digital signal processor (DSP), or a programmable logic controller (PLC), etc., in the apparatus for communication processing or a network device to which the apparatus for communication processing belongs.

The apparatus for communication processing described in this embodiment may be disposed on the side of network device such as a base station.

Those skilled in the art should understand that the functions of each processing module in the apparatus for communication processing in the embodiments of the disclosure may be understood by referring to the foregoing description of the method for communication processing applied to the side of network device. The processing module may be implemented by an analog circuit that implements the functions described in the embodiments of the disclosure, and may also be implemented by running software on a network device that executes the functions described in the embodiments of the disclosure.

The apparatus for communication processing described in the embodiments of the disclosure improves the reliability and robustness of PDCCH communication.

Figure 5:
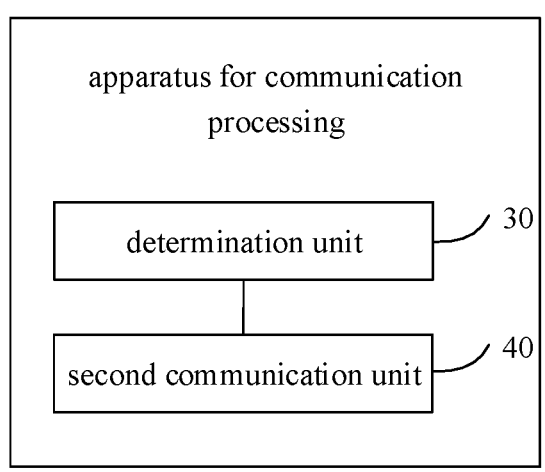
FIG. 5 is a second block diagram of an apparatus for communication processing according to an embodiment.

FIG. 5 is a second block diagram of an apparatus for communication processing according to an embodiment. The apparatus for communication processing is applied to the side of UE. Referring to FIG. 5, the apparatus includes a determination unit 30 and a second communication unit 40.

The determination unit 30 is configured to determine at least two time domain parameters and/or at least two received beams to receive same downlink control information (DCI).

The second communication unit 40 is configured to receive the DCI with different received beams based on different time domain parameters in the at least two time domain parameters, where the DCI is sent by a network device via a physical downlink control channel (PDCCH) based on the different time domain parameters.

In some embodiments, the determination unit 30 is further configured to: determine a search space configured by the network device, and the at least two time domain parameters correspond to the same search space.

In some embodiments, the at least two time domain parameters correspond to different symbols within a slot in the search space.

In some embodiments, the at least two time domain parameters correspond to symbols in different slots in the search space.

In some embodiments, the determination unit 30 is further configured to: determine a search space and a relative offset value of the search space configured by the network device, where a first time domain parameter in the at least two time domain parameters corresponds to the search space, and the relative offset value of the search space is an offset value of a second time domain parameter in the at least two time domain parameters relative to the first time domain parameter.

The second time domain parameter in the at least two time domain parameters is determined based on the search space and the relative offset value of the search space.

In the above solution, the relative offset value of the search space includes: one or more combinations of a relative offset value of a PDCCH monitoring cycle, a relative offset value of a PDCCH monitoring slot offset value, and a relative offset value of a within-slot monitoring-symbol position.

In some embodiments, the determination unit 30 is further configured to: determine at least two search spaces configured by the network device, and different time domain parameters in the at least two time domain parameters correspond to different search spaces.

Configuration of the search space includes configuration of the following parameters: a PDCCH monitoring cycle, a PDCCH monitoring slot offset value and a within-slot monitoring-symbol position In some embodiments, the determination unit 30 is further configured to: determine a control resource set configured by the network device, wherein the at least two search spaces correspond to the same control resource set.

In some embodiments, the determination unit 30 is further configured to: determine a control resource set identifier, wherein different received beams corresponding to different search spaces in the control resource set are determined based on the control resource set identifier.

In some embodiments, among configuration parameters of the at least two search spaces, at least one of a PDCCH monitoring cycle parameter, a PDCCH monitoring slot offset parameter and a within-slot monitoring-symbol position parameter is different.

In some embodiments, the determination unit 30 is further configured to: determining at least two control resource sets configured by the network device, wherein different search spaces in the at least two search spaces correspond to different control resource sets in the at least two control resource sets.

In some embodiments, frequency domain resources of the at least two control resource sets are identical.

In some embodiments, time domain resources of the at least two control resource sets are identical, and control resource set identifiers or cell identifiers of the at least two control resource sets are different.

In some embodiments, the determination unit 30 is further configured to: determine at least two different received beams configured by the network device for the same search space, or determine different received beams configured by the network device for different search spaces under the same control resource set, or determine different received beams configured by the network device for different control resource sets.

The different received beams are configured for the UE to receive DCI from different cells, or DCI from different transmitter receiver points (TRPs) in the same cell, or DCI from different antenna panels of the same TRP.

In some embodiments, the determination unit 30 is further configured to: determine DCI to be sent by the network device via the PDCCH under the at least two time domain parameters is identical based on a configuration signaling.

In some embodiments, the second communication unit 40 is further configured to: receive a signaling that includes a transmission configuration indication (TCI) state, and determine a received beam based on the TCI state.

Regarding the apparatus in the above embodiments, the specific manners in which each module performs the operations have been described in detail in the method embodiments, which may not be described in detail here.

In practical applications, the specific structures of the determination unit 30 and the second communication unit 40 may be implemented by the CPU, MCU, DSP or PLC in the apparatus for communication processing or the UE to which the apparatus for communication processing belongs.

The apparatus for communication processing described in this embodiment may be disposed on the side of UE.

Those skilled in the art should understand that the functions of each processing module in the apparatus for communication processing according to the embodiment of the disclosure may be understood by referring to the foregoing description of the method for communication processing applied to the side of UE. The module may be implemented by an analog circuit that implements the functions described in the embodiments of the disclosure, and may also be implemented by running software on a terminal that implements the functions described in the embodiments of the disclosure.

The apparatus for communication processing described in the embodiments of the disclosure may improve the reliability and robustness of PDCCH communication.

Figure 6:
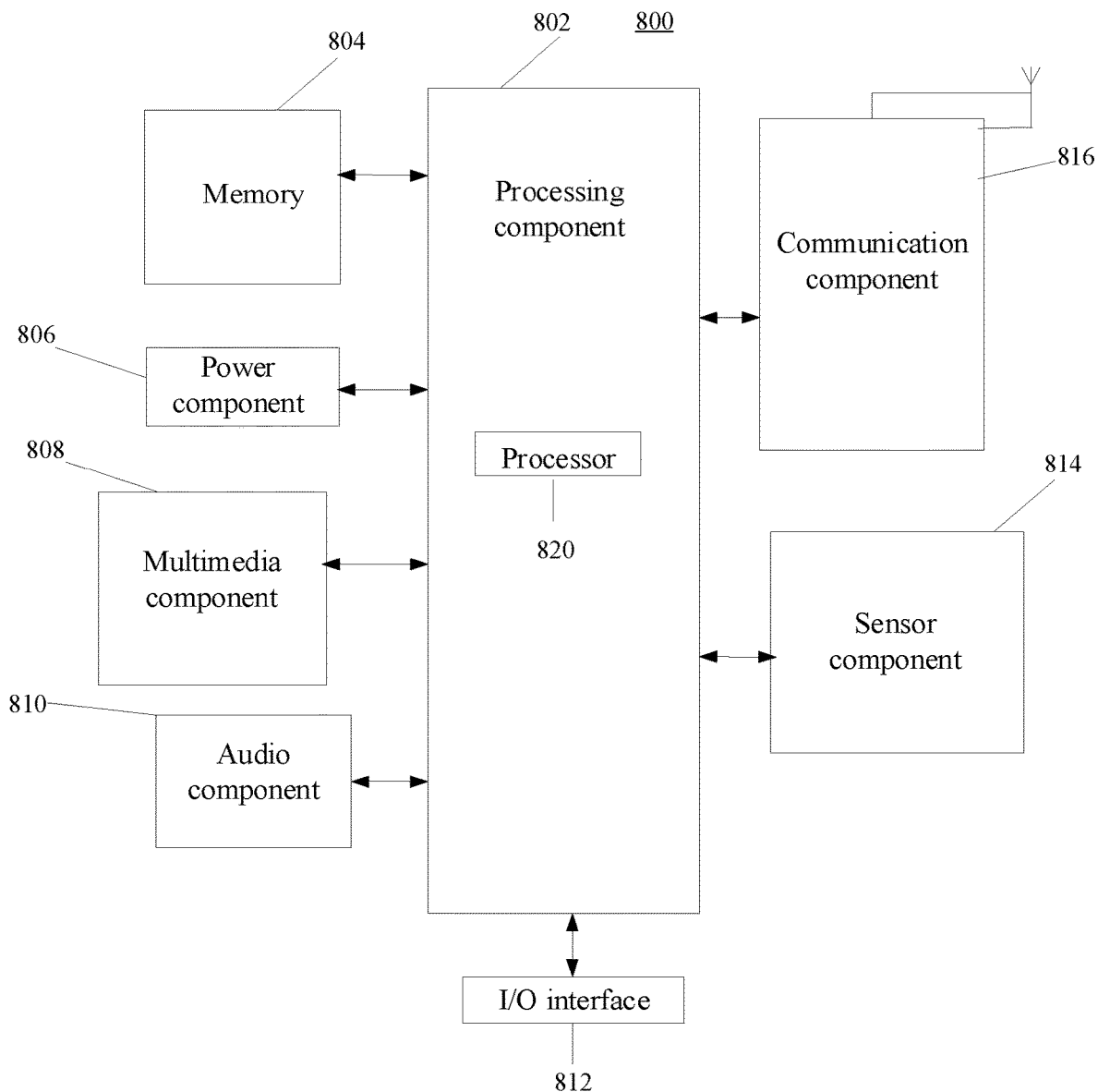
FIG. 6 is a block diagram of a device 800 for implementing communication processing according to an embodiment.

FIG. 6 is a block diagram of a device 800 for implementing communication processing according to an embodiment. For example, the device 800 may be a terminal, which may be a mobile phone, a computer, a digital broadcast terminal, a messaging device, a game console, a tablet device, a medical device, a fitness device, a personal digital assistant, or the like.

Referring to FIG. 6, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the device 800, such as the operations associated with display, phone calls, data communications, camera operations, and recording operations. The processing component 802 may include one or more processors 820 to execute instructions to perform all or some of the steps of the methods described above. Moreover, the processing component 802 may include one or more modules that facilitate interactions between the processing component 802 and other components. For example, the processing component 802 may include a multimedia module to facilitate interactions between the multimedia component 808 and the processing component 802.

The memory 804 is configured to store various types of data to support operation of the device 800. Examples of such data include instructions for any application or method operating on the device 800, contact data, phonebook data, messages, pictures, videos, and the like. The memory 804 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC for short) that is configured to receive external audio signals when the device 800 is in an operating mode, such as a call mode, a recording mode, and a voice recognition mode. The received audio signal may be further stored in the memory 804 or transmitted via the communication component 816. In some embodiments, the audio component 810 also includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a complementary metal oxide semiconductor (CMOS) or a charge-coupled device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or their combination. In an embodiment, the communication component 816 receives a broadcast signal or broadcast associated information from an external broadcast management system via a broadcast channel. In an embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method for communication processing applied to the side of UE.

In embodiments, there is also provided a non-transitory computer readable storage medium including executable instructions, such as included in the memory 804, executable by the processor 820 in the device 800, for performing the above method. For example, the non-transitory computer-readable storage medium may be a ROM, a random access memory (RAM), a CD-ROM, a magnetic tape, a floppy disc, an optical data storage device, and the like.

Figure 7:
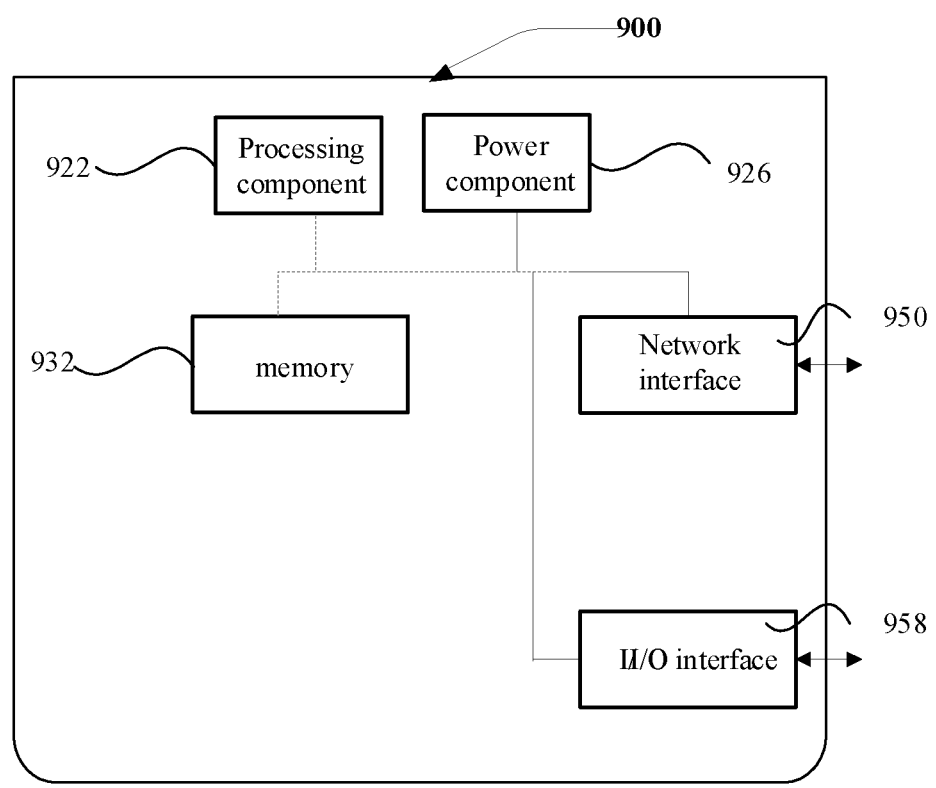
FIG. 7 is a block diagram of a device 900 for implementing communication processing according to an embodiment.

FIG. 7 is a block diagram of a device 900 for implementing communication processing according to an embodiment. For example, the device 900 may be provided as a server. As illustrated in FIG. 9, the device 900 includes a processing component 922, which further includes one or more processors, and a memory resource represented by a memory 932, for storing instructions executable by the processing component 922, such as an application program. The application program stored in the memory 932 may include one or more modules, each corresponding to a set of instructions. Additionally, the processing component 922 is configured to execute instructions to perform the method for communication processing applied to the side of network device.

The device 900 may also include a power supply assembly 926 configured to perform power management of the device 900, a wired or wireless network interface 950 configured to connect the device 900 to a network, and an input output (I/O) interface 958. The device 900 may operate based on an operating system stored in the memory 932, such as Windows Server™, Mac OS X™, Unix™, Linux™, FreeBSD™ or the like.

The technical solutions described in the embodiments of the disclosure may be combined arbitrarily if there is no conflict.

Those skilled in the art will be aware of other embodiments of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope of the disclosure are indicated in the following claims.

It should be understood that the present disclosure is not limited to the precise structures described above and illustrated in the accompanying drawings. The scope of the present disclosure is limited only by the appended claims.

The invention claimed is:

1. A method for communication processing, comprising:
configuring, by a network device, at least one of at least two time domain parameters or at least two received beams for a user equipment (UE) to receive downlink control information (DCI);
sending, by the network device, the DCI to the UE via a physical downlink control channel (PDCCH) based on the at least two time domain parameters; and
configuring at least two search spaces for the UE, wherein different search spaces correspond to different time domain parameters, and wherein configuration of the search space comprises configuration of following parameters: a PDCCH monitoring cycle, a PDCCH monitoring slot offset value and a within-slot monitoring-symbol position.

2. The method of claim 1, further comprising:
configuring a search space for the UE, wherein the at least two time domain parameters correspond to the search space.

3. The method of claim 2, wherein the at least two time domain parameters correspond to different symbols within a slot in the search space.

4. The method of claim 2, wherein the at least two time domain parameters correspond to symbols within different slots in the search space.

5. The method of claim 1, further comprising:
configuring a search space for the UE, wherein a first time domain parameter in the at least two time domain parameters corresponds to the search space; and
configuring a relative offset value of the search space for the UE, wherein the relative offset value of the search space is an offset value of a second time domain parameter in the at least two time domain parameters relative to the first time domain parameter, and the relative offset value of the search space comprises one or more combinations of a relative offset value of a PDCCH monitoring cycle, a relative offset value of a PDCCH monitoring slot offset value, and a relative offset value of a within-slot monitoring-symbol position.

6. The method of claim 1, further comprising:
configuring a control resource set for the UE, wherein the at least two search spaces correspond to the control resource set.

7. The method of claim 6, further comprising:
configuring a control resource set identifier for the control resource set, wherein the control resource set identifier is configured to indicate that received beams corresponding to different search spaces in the control resource set are different.

8. The method of claim 6, wherein,
among configuration parameters of the at least two search spaces, at least one of a PDCCH monitoring cycle, a PDCCH monitoring slot offset or a within-slot monitoring-symbol position is different.

9. The method of claim 1, further comprising:
configuring at least two control resource sets for the UE, wherein different search spaces in the at least two search spaces correspond to different control resource sets in the at least two control resource sets.

10. The method of claim 9, wherein,
frequency domain resources of the at least two control resource sets are identical.

11. The method of claim 10, wherein time domain resources of the at least two control resource sets are identical, and control resource set identifiers or cell identifiers of the at least two control resource sets are different.

12. The method of claim 1, further comprising:
sending a signaling that includes a transmission configuration indication (TCI) state, wherein the TCI state comprises one of TCI state information of at least one cell, or TCI state information of at least one TRP in a cell, or TCI state information of at least one antenna panel of a TRP.

13. A method for communication processing, comprising:
determining, by a user equipment (UE), at least one of at least two time domain parameters or at least two received beams to receive downlink control information (DCI);
receiving, by the UE, the DCI with different received beams based on different time domain parameters in the at least two time domain parameters, wherein the DCI is sent by a network device via a physical downlink control channel (PDCCH) based on the different time domain parameters; and
determining at least two search spaces configured by the network device, wherein different search spaces correspond to different time domain parameters, and wherein configuration of the search space comprises configuration of following parameters: a PDCCH monitoring cycle, a PDCCH monitoring slot offset value and a within-slot monitoring-symbol position.

14. The method of claim 13, further comprising:
determining at least two control resource sets configured by the network device, wherein different search spaces in the at least two search spaces correspond to different control resource sets in the at least two control resource sets.

15. A network device, comprising:
a processor; and
a memory for storing executable instructions;
wherein when the executable instructions are executed, the processor is configured to implement the method for communication processing according to claim 1.

16. A user equipment (UE), comprising:
a processor; and
a memory for storing executable instructions;
wherein when the executable instructions are executed, the processor is configured to implement a method for communication processing, the method comprising:
determining at least one of at least two time domain parameters and at least two received beams to receive downlink control information (DCI);
receiving the DCI with different received beams based on different time domain parameters in the at least two time domain parameters, wherein the DCI is sent by a network device via a physical downlink control channel (PDCCH) based on the different time domain parameters; and
determining at least two search spaces configured by the network device, wherein different search spaces correspond to different time domain parameters, and wherein configuration of the search space comprises configuration of following parameters: a PDCCH monitoring cycle, a PDCCH monitoring slot offset value and a within-slot monitoring-symbol position.

\* \* \* \* \*